United States Patent
Lam

(10) Patent No.: US 11,682,417 B1
(45) Date of Patent: Jun. 20, 2023

(54) ASYMMETRIC WRITE HEAD SHIELDS COMPATIBLE WITH DUAL-FREE-LAYER (DFL) READERS

(71) Applicant: Western Digital Technologies, Inc., San Jose, CA (US)

(72) Inventor: Quan-Chiu Harry Lam, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/740,293

(22) Filed: May 9, 2022

(51) Int. Cl.
*G11B 5/115* (2006.01)

(52) U.S. Cl.
CPC ................................ *G11B 5/115* (2013.01)

(58) Field of Classification Search
None
See application file for complete search history.

(56) References Cited

U.S. PATENT DOCUMENTS

| | | | |
|---|---|---|---|
| 7,729,092 B1 | 6/2010 | Mallary et al. | |
| 8,274,758 B2 | 9/2012 | Wu et al. | |
| 8,879,208 B1 | 11/2014 | Liu et al. | |
| 9,396,741 B1* | 7/2016 | Tian | G11B 5/315 |
| 11,170,808 B1 | 11/2021 | Liu et al. | |
| 2002/0018323 A1* | 2/2002 | Li | G01R 33/093 |
| 2007/0247751 A1* | 10/2007 | Hsiao | G11B 5/11 |
| 2009/0073616 A1* | 3/2009 | Shimazawa | G11B 5/3116 |
| | | | 360/319 |
| 2009/0219649 A1* | 9/2009 | Hsiao | G11B 5/3116 |
| | | | 360/122 |
| 2013/0069642 A1 | 3/2013 | Sapozhnikov et al. | |
| 2013/0272104 A1* | 10/2013 | Gao | G11B 5/1278 |
| | | | 369/13.33 |
| 2015/0380018 A1* | 12/2015 | Zheng | G11B 5/3163 |
| | | | 360/235.4 |
| 2019/0385638 A1* | 12/2019 | Wu | G11B 5/3912 |

FOREIGN PATENT DOCUMENTS

JP 2000048327 A * 2/2000 ........... G11B 5/3903

OTHER PUBLICATIONS

Honda, Naoki et al., "Write Margin Improvement in Bit Patterned Media With Inclined Anisotropy at High Areal Densities", IEEE Transaction on Magnetics, Feb. 2011, pp. 1-5.

* cited by examiner

*Primary Examiner* — William J Klimowicz
(74) *Attorney, Agent, or Firm* — Patterson + Sheridan, LLP; Steven H. VerSteeg

(57) ABSTRACT

The present disclosure is generally directed towards magnetic recording systems comprising a dual free layer (DFL) read head and a magnetic recording head having stable magnetization. The magnetic recording head comprises a main pole disposed at a media facing surface (MFS), and a plurality of shields, such as a lower leading shield, an upper leading shield, a pair of side shields, and a trailing shield. Each of the shields individually comprises a first leg disposed at and parallel to the MFS and a second leg coupled to the first leg, the second leg being recessed from the MFS. When the kind of magnetization initialization needed by the DFL read head is applied to the magnetic recording head during the manufacturing process, the second leg of each of the shields of the magnetic recording device causes the magnetization directions of the shields to individually switch to a stable state.

19 Claims, 10 Drawing Sheets

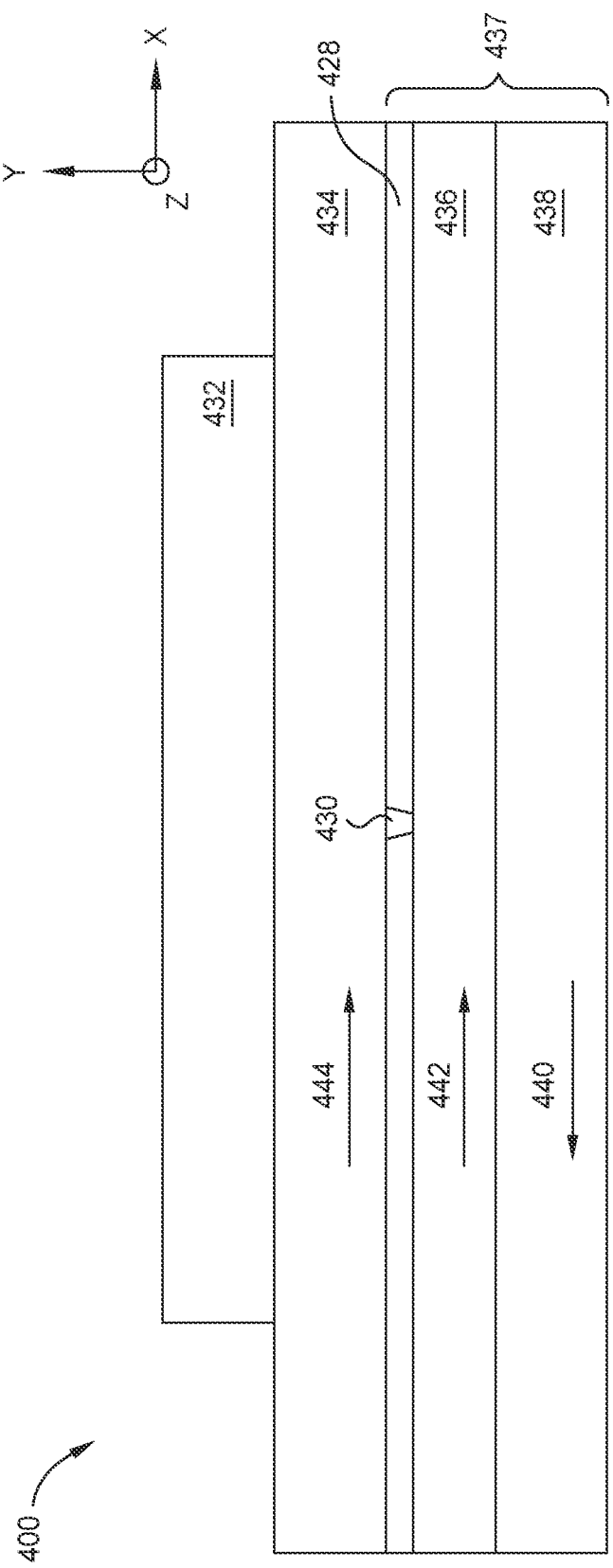

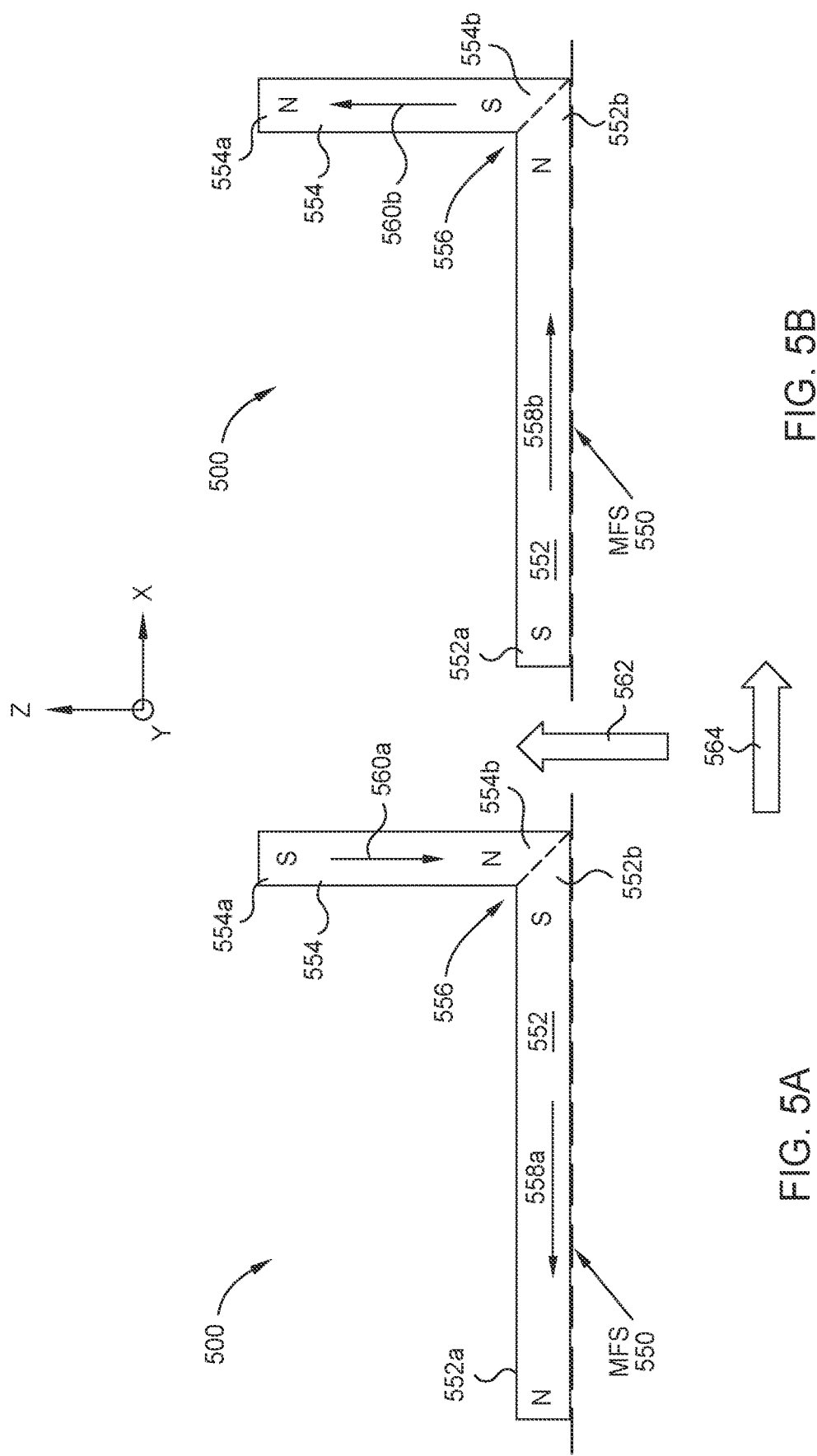

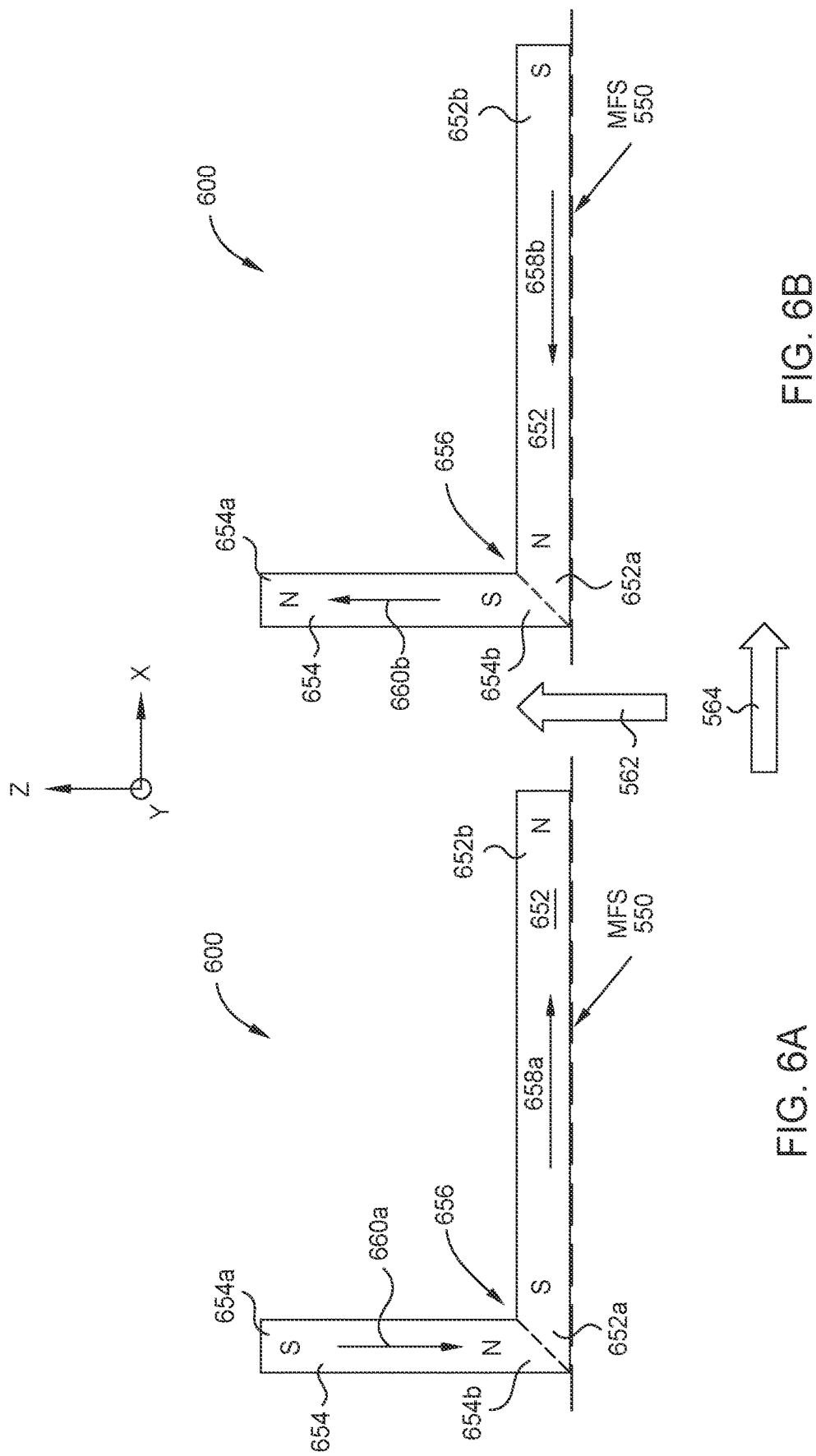

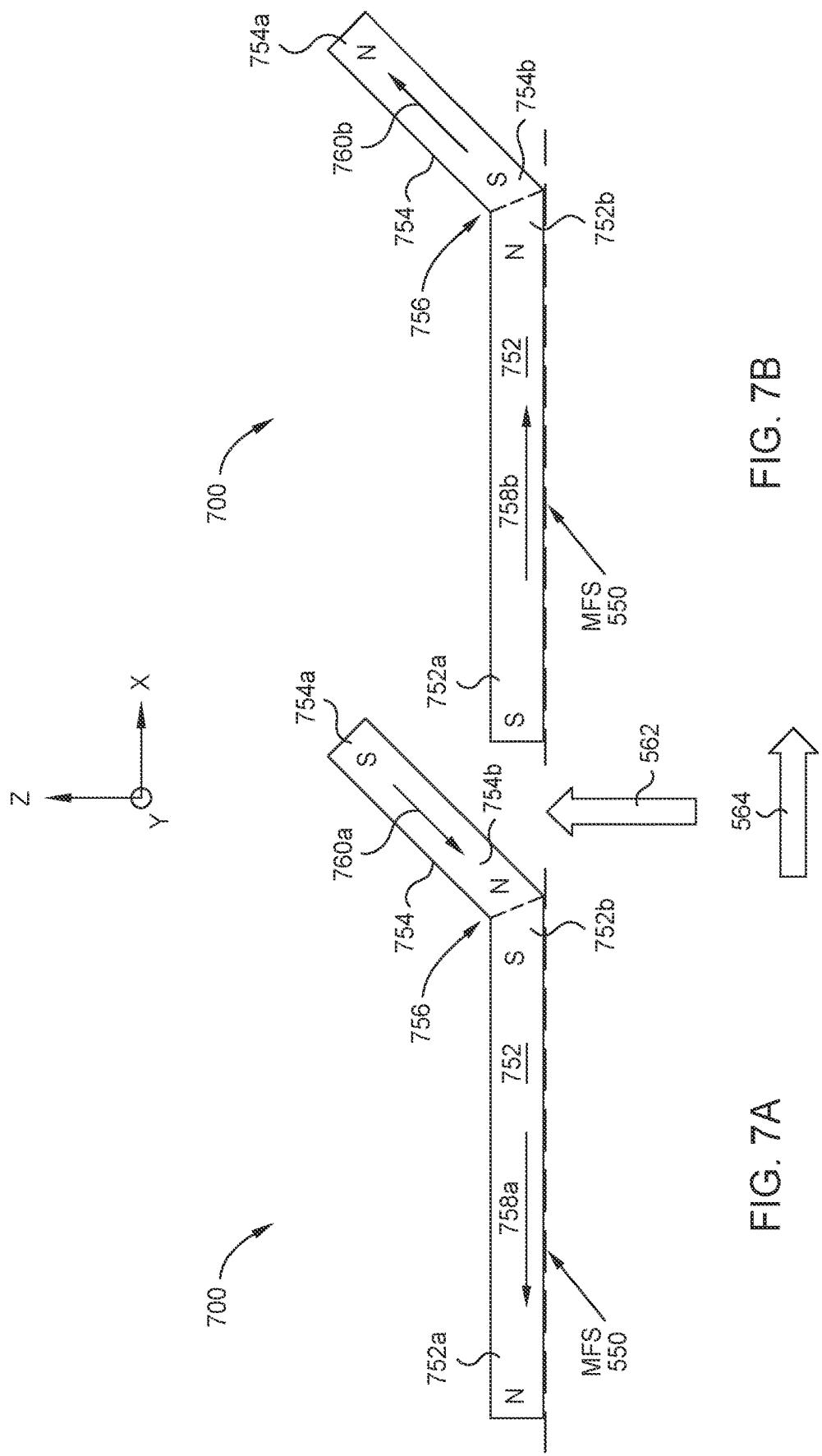

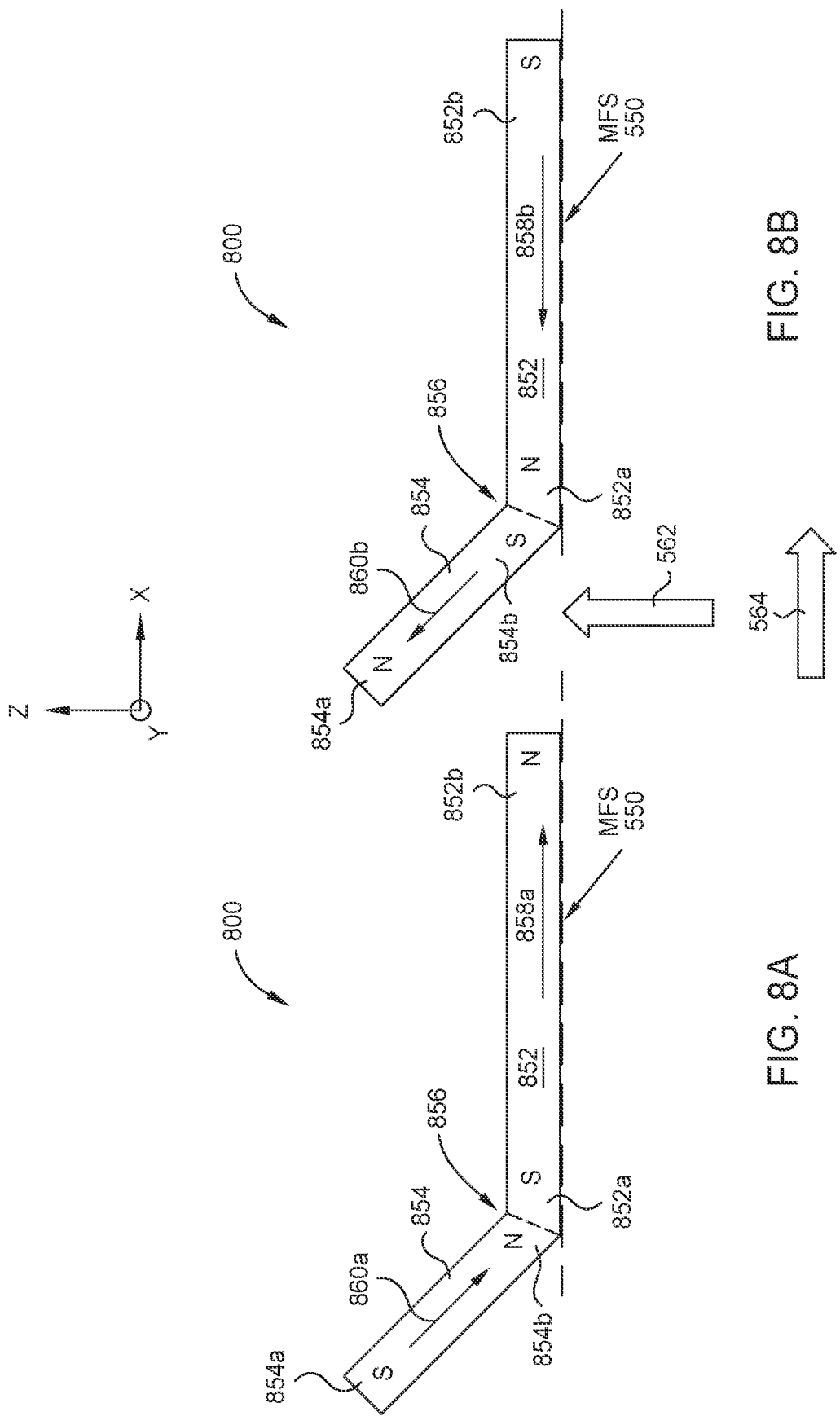

ASYMMETRIC WRITE HEAD SHIELDS COMPATIBLE WITH DUAL-FREE-LAYER (DFL) READERS

BACKGROUND OF THE DISCLOSURE

Field of the Disclosure

Embodiments of the present disclosure relate generally to magnetic recording systems comprising a dual free layer read head and a magnetic recording head having stable magnetization.

Description of the Related Art

Over the past few years, various magnetic recording methods have been studied to improve the areal density of a magnetic media device, such as a hard disk drive (HDD). Magnetic recording devices, or, in particular, the write heads, in HDDs can have a significant effect on the overall performance and reliability of the recording device. Magnetic recording heads may be designed to achieve specific advantages, such as improved performance, but may consequently have a negative impact on other characteristics, such as decreased reliability.

For example, some magnetic recording head designs use various shields around a main pole of the write head, such as side shields, leading shields, and trailing shields, to make the magnetic recording head sufficiently strong to write data to magnetic media, without disturbing the data that have already been previously written. However, in magnetic recording devices, a magnetization initialization must be applied to a dual free layer (DFL) read head prior to the magnetic recording device writing to and reading data from a media. The specific types of magnetization initialization needed by the DFL read head can cause the magnetization directions of the various shields of the magnetic recording heads or write heads to switch to undesirable states or directions. As such, the magnetization stability of the various shields of the write head are often compromised.

Therefore, there is a need in the art for a magnetic recording device comprising a DFL read head and a magnetic recording write head having improved shields with stable magnetization.

SUMMARY OF THE DISCLOSURE

The present disclosure is generally directed towards magnetic recording systems comprising a dual free layer (DFL) read head and a magnetic recording head having stable magnetization. The magnetic recording head comprises a main pole disposed at a media facing surface (MFS), and a plurality of shields, such as a lower leading shield, an upper leading shield, a pair of side shields, and a trailing shield. Each of the shields individually comprises a first leg disposed at and parallel to the MFS and a second leg coupled to the first leg, the second leg being recessed from the MFS. When the kind of magnetization initialization needed by the DFL read head is applied to the whole magnetic recording head during the manufacturing process, the second leg of each of the shields of the magnetic recording device causes the magnetization directions of the shields to individually switch to a stable state.

In one embodiment, a magnetic recording head comprises a dual free layer read head, and a magnetic recording write head disposed adjacent to the dual free layer read head, the magnetic recording write head comprising: a main pole disposed at a media facing surface (MFS), a lower leading shield disposed below the main pole at the MFS, an upper leading shield disposed between the lower leading shield and the main pole at the MFS, and a trailing shield disposed above the main pole at the MFS, wherein one or more of the lower leading shield, the upper leading shield, and the trailing shield comprises a first leg disposed at and parallel to the MFS and a second leg coupled to the first leg, the second leg extending from the MFS in a direction perpendicular to the MFS, wherein the first leg and the second leg each individually comprise a first end and a second end having opposite magnetic poles.

In another embodiment, a magnetic recording head comprises a write head, the write head comprising a main pole disposed at a MFS, a lower leading shield disposed below the main pole, the lower leading shield comprising a first leg disposed at the MFS and a second leg extending from the MFS in a direction perpendicular to the MFS, a first end of the second leg being coupled to a first end of the first leg, wherein the first end of the first leg and the first end of the second leg have opposite magnetic poles, and an upper leading shield disposed between the lower leading shield and the main pole, the upper leading shield comprising a third leg disposed at the MFS and a fourth leg extending from the MFS in the direction perpendicular to the MFS, wherein a first end of the third leg is aligned with the first end of the first leg of the lower leading shield, and wherein a second end of the third leg opposite the first end is coupled to a first end of the fourth leg, the second end of the third leg and the first end of the fourth leg have opposite magnetic poles.

In yet another embodiment, a magnetic recording device comprises a dual free layer read head and a magnetic recording write head disposed adjacent to the dual free layer read head. The magnetic recording write head comprises an asymmetric lower leading shield disposed at a media facing surface (MFS), the asymmetric lower leading shield comprising a first leg disposed at the MFS and a second leg extending from the MFS in a direction perpendicular to the MFS, the second leg being coupled to a first end of the first leg, an asymmetric upper leading shield disposed on the asymmetric lower leading shield, the asymmetric upper leading shield comprising a third leg disposed at the MFS and a fourth leg extending from the MFS in the direction perpendicular to the MFS, wherein a first end of the third leg is aligned with the first end of the first leg of the asymmetric lower leading shield, and wherein a second end of the third leg opposite the first end is coupled to a fourth leg, and an asymmetric trailing shield disposed over the asymmetric upper leading shield, the asymmetric trailing shield comprising a fifth leg disposed at the MFS and a sixth leg extending from the MFS in the direction perpendicular to the MFS, wherein a first end of the fifth leg is aligned with the first end of the first leg of the asymmetric lower leading shield, and wherein a second end of the fifth leg opposite the first end is coupled to a sixth leg.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not

FIG. 4 illustrates a MFS view of a magnetic recording head or write head, according to one embodiment.

FIG. 5A illustrates a first shield having an L-like shape before a magnetization initialization, and FIG. 5B illustrates the first shield after the magnetization initialization, according to one embodiment.

FIG. 6A illustrates a second shield having an L-like shape before a magnetization initialization, and FIG. 6B illustrates the second shield after the magnetization initialization, according to another embodiment.

FIG. 7A illustrates a third shield having a hockey stick-like shape before a magnetization initialization, and FIG. 7B illustrates the third shield after the magnetization initialization, according to one embodiment.

FIG. 8A illustrates a fourth shield having a hockey stick-like shape before a magnetization initialization, and FIG. 8B illustrates the fourth shield after the magnetization initialization, according to another embodiment.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure is generally directed towards magnetic recording systems comprising a dual free layer (DFL) read head and a magnetic recording head having stable magnetization. The magnetic recording head comprises a main pole disposed at a media facing surface (MFS), and a plurality of shields, such as a lower leading shield, an upper leading shield, a pair of side shields, and a trailing shield. Each of the shields individually comprises a first leg disposed at and parallel to the MFS and a second leg coupled to the first leg, the second leg being recessed from the MFS. When the kind of magnetization initialization needed by the DFL read head is applied to the magnetic recording head during the manufacturing process, particularly with a magnetic field perpendicular to the MFS, the second leg of each of the shields of the magnetic recording device causes the magnetization directions of the shields to individually switch to a stable state.

Figure 1:
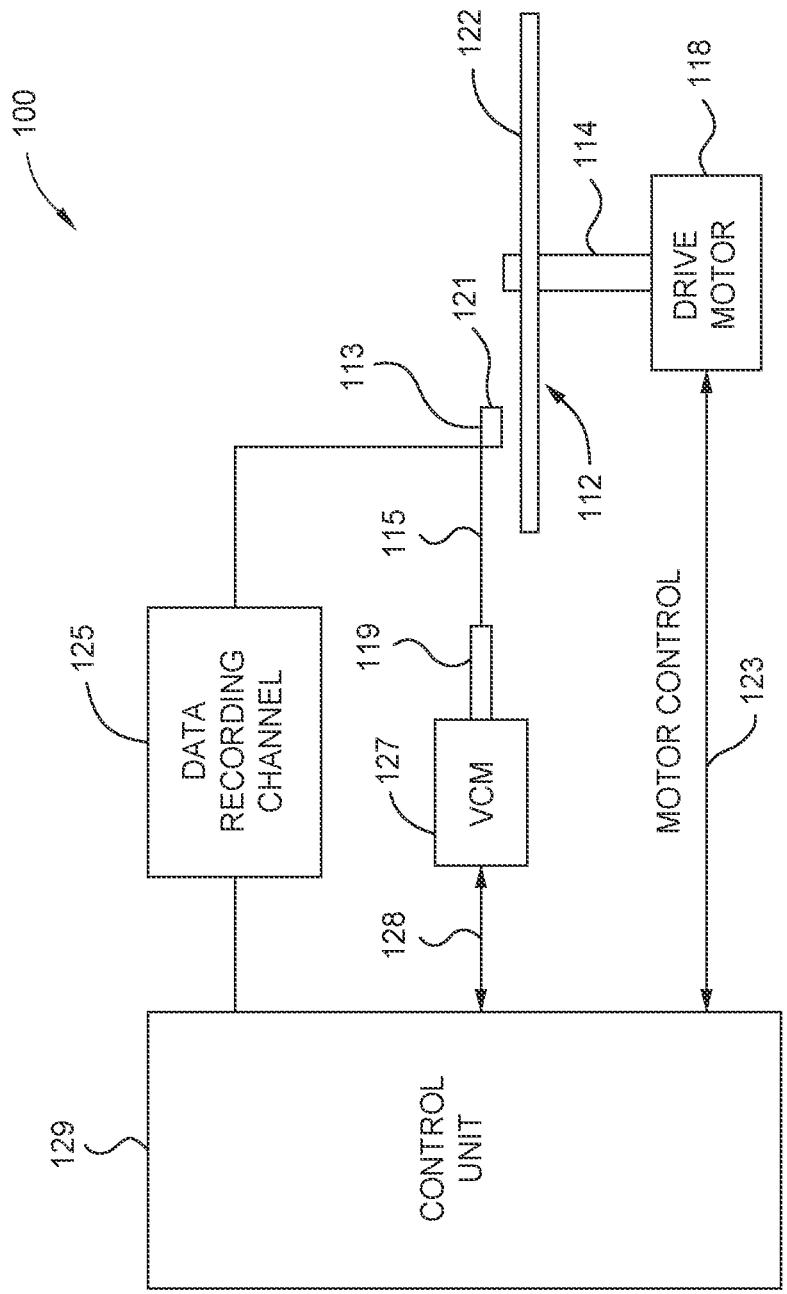
FIG. 1 illustrates a disk drive embodying this disclosure.

FIG. 1 illustrates a disk drive 100 embodying this disclosure. As shown, at least one rotatable magnetic media 112 is supported on a spindle 114 and rotated by a disk drive motor 118. The magnetic recording on each disk is in the form of any suitable patterns of data tracks, such as annular patterns of concentric data tracks (not shown) on the magnetic media 112.

At least one slider 113 is positioned near the magnetic media 112, each slider 113 supporting one or more magnetic head assemblies 121. As the magnetic media rotates, the slider 113 moves radially in and out over the media surface 122 so that the magnetic head assembly 121 may access different tracks of the magnetic media 112 where desired data are written. Each slider 113 is attached to an actuator arm 119 by way of a suspension 115. The suspension 115 provides a slight spring force which biases the slider 113 toward the media surface 122. Each actuator arm 119 is attached to an actuator means 127. The actuator means 127 as shown in FIG. 1 may be a voice coil motor (VCM). The VCM includes a coil movable within a fixed magnetic field, the direction and speed of the coil movements being controlled by the motor current signals supplied by control unit 129.

During operation of the disk drive 100, the rotation of the magnetic media 112 generates an air bearing between the slider 113 and the media surface 122 which exerts an upward force or lift on the slider 113. The air bearing thus counterbalances the slight spring force of suspension 115 and supports slider 113 off and slightly above the media 112 surface by a small, substantially constant spacing during normal operation. In the case of EAMR, a DC magnetic field generated from an assist element of the magnetic head assembly 121 enhances the write-ability so that the write element of the magnetic head assembly 121 may efficiently magnetize the data bits in the media 112.

The various components of the disk drive 100 are controlled in operation by control signals generated by control unit 129, such as access control signals and internal clock signals. Typically, the control unit 129 comprises logic control circuits, storage means, and a microprocessor. The control unit 129 generates control signals to control various system operations, such as drive motor control signals on line 123 and head position and seek control signals on line 128. The control signals on line 128 provide the desired current profiles to optimally move and position slider 113 to the desired data track on media 112. Write and read signals are communicated to and from write and read heads on the assembly 121 by way of recording channel 125.

The above description of a typical magnetic disk storage system and the accompanying illustration of FIG. 1 are for representation purposes only. It should be apparent that disk storage systems may contain a large number of disks and actuators, and each actuator may support a number of sliders.

It is to be understood that the embodiments discussed herein are applicable to a data storage device such as a hard disk drive (HDD) as well as a tape drive such as a tape embedded drive (TED) or an insertable tape media drive, such as those conforming to the LTO (Linear Tape Open) standards. An example TED is described in U.S. Pat. No. 10,991,390, issued Apr. 27, 2021, titled "Tape Embedded Drive," and assigned to the same assignee of this application, which is herein incorporated by reference. As such, any reference in the detailed description to an HDD or tape drive is merely for exemplification purposes and is not intended to limit the disclosure unless explicitly claimed. For example, references to disk media in an HDD embodiment are provided as examples only, and can be substituted with tape media in a tape drive embodiment. Furthermore, reference to or claims directed to magnetic recording devices or data storage devices are intended to include at least both HDD and tape drive unless HDD or tape drive devices are explicitly claimed.

Figure 2:
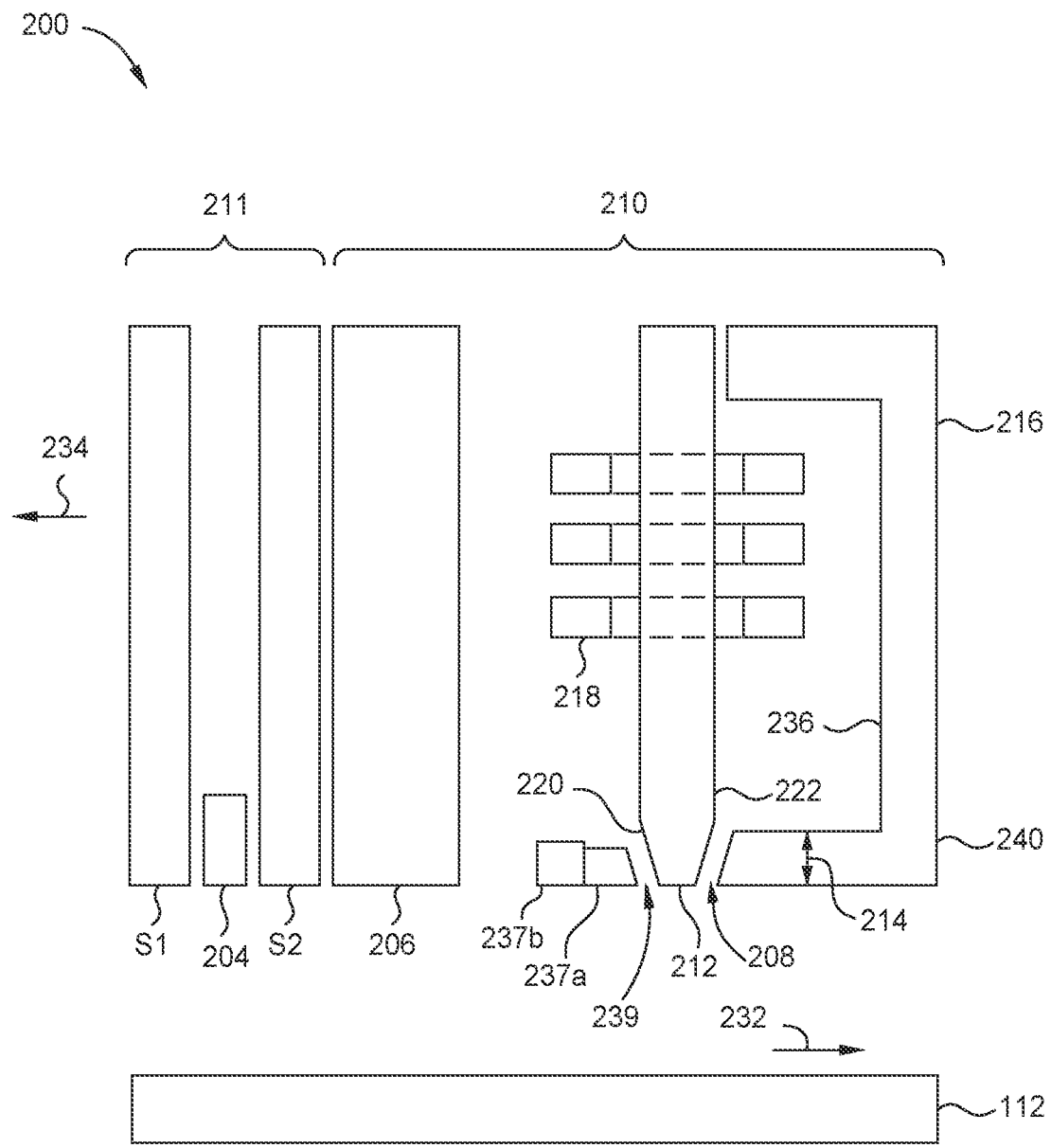
FIG. 2 is a fragmented, cross-sectional side view through the center of a read/write head facing a magnetic media, according to one embodiment.

FIG. 2 is a fragmented, cross sectional side view through the center of a read/write head 200 facing the magnetic media 112, according to one embodiment. The read/write head 200 may correspond to the magnetic head assembly 121 described in FIG. 1. The read/write head 200 includes a media facing surface (MFS) 212, such as an air bearing surface (ABS), a magnetic write head 210, and a magnetic read head 211, and is mounted such that the MFS 212 is facing the magnetic media 112. The read/write head 200 may be an energy-assisted magnetic recording (EAMR) head or a perpendicular magnetic recording (PMR) head. In FIG. 2, the magnetic media 112 moves past the write head 210 in the direction indicated by the arrow 232 and the read/write head 200 moves in the direction indicated by the arrow 234.

In some embodiments, the magnetic read head 211 is a magnetoresistive (MR) read head that includes an MR sensing element 204 located between MR shields S1 and S2. In other embodiments, the magnetic read head 211 is a magnetic tunnel junction (MTJ) read head that includes a MTJ sensing element 204 located between MR shields S1 and S2. The magnetic fields of the adjacent magnetized regions in the magnetic media 112 are detectable by the MR (or MTJ) sensing element 204 as the recorded bits. In yet other embodiments, the magnetic read head 211 is a dual free layer (DFL) read head, which often requires magnetic initialization with a magnetic field perpendicular to the MFS at the end of the manufacturing process. Such a perpendicular magnetic field tends to be destabilizing to the shields of the write head, the effects of which are addressed by the various embodiments disclosed.

The write head 210 includes a main pole 220, an upper return pole 216 coupled to a trailing shield 240, and a coil 218 that excites the main pole 220. The write head 210 optionally comprises an additional return pole 206. The write head 210 may further comprise one or more leading shields 237a, 237b (which may collectively be referred to as leading shield 237) disposed between the main pole 220 and the return pole 206. The leading shield 237 may be one single layer, or the leading shield may comprise an upper leading shield 237a and a lower leading shield 237b, like shown in FIG. 2. The leading shield 237 is spaced from the main pole 220 by a leading gap 239. The upper and lower leading shields 237a, 237b are disposed at the MFS. On a surface of the lower leading shield 237b opposite the MFS, a copper electrical lead (not shown) may be attached. The copper electrical lead may be one of a plurality of leads providing a bias current in energy-assisted magnetic recording (EAMR). The bias current usually flows thru the main pole 220, into an energy assist element in the trailing or leading gap or both, and then into either the trailing shield 240 and/or the leading shields 237a, 237b and/or side shields (shown in FIG. 4). Both upper and lower leading shields 237a, 237b and the side shields are all electrically and magnetically connected.

The coil 218 may have a "pancake" structure which winds around a back-contact between the main pole 220 and the upper return pole 216, instead of a "helical" structure shown in FIG. 2. A trailing gap 208 located between the trailing shield 240 and the main pole 220, and a leading gap 239, may be in contact with the main pole 220 and a leading shield 237a may be in contact with the leading gap. A recording magnetic field is generated from the main pole 220 and the trailing shield 240 helps making the magnetic field gradient of the main pole 220 steep. Extending from the MFS into the read/write head 200, the portion of the trailing shield 240 disposed adjacent to the main pole 220 has a throat height 214. The main pole 220 may be a magnetic material such as an FeCo alloy. The main pole 220 may include a trailing surface 222, which may be parallel to a leading surface 236 of the trailing shield 240. The main pole 220 may be a tapered write pole (TWP) with a trailing edge taper (TET) configuration. The main pole 220 may comprise ferromagnetic materials, typically alloys of one or more of Co, Fe, and Ni.

Figure 3A:
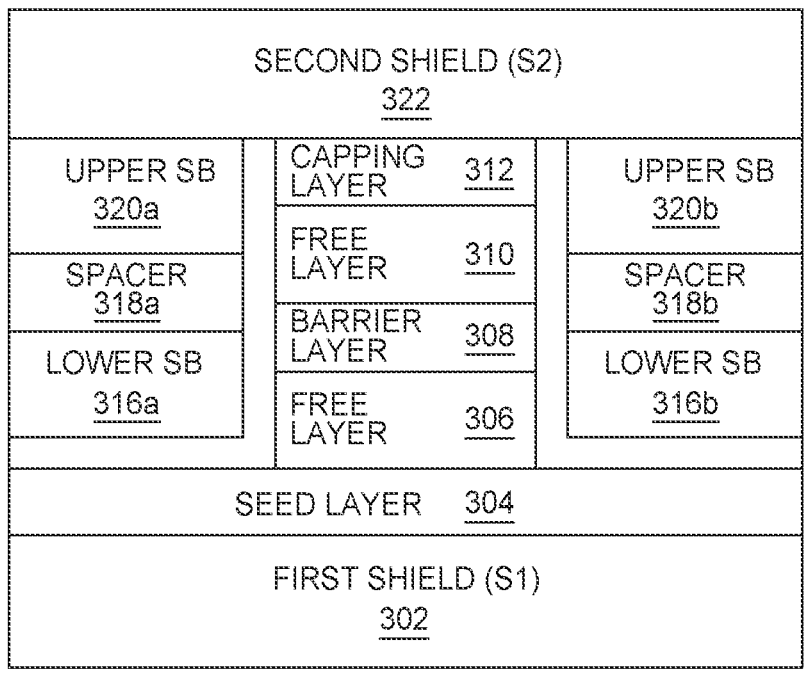
FIGS. 3A-3B illustrate a dual free layer (DFL) read head, according to one embodiment.
Figure 3B:
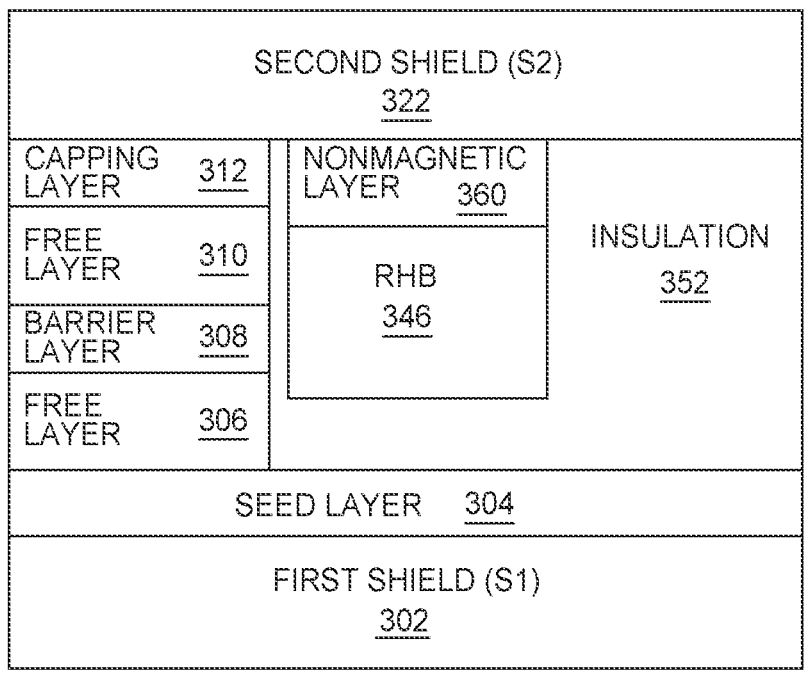

FIGS. 3A-3B illustrate a dual free layer (DFL) read head 300, according to one embodiment. FIG. 3A illustrates a media facing surface (MFS) view of the DFL read head 300, and FIG. 3B illustrates an APEX (i.e., a vertical cross-sectional) view of the DFL read head 300. The DFL read head 300 may correspond to, or be a part of, the magnetic head assembly 121 described in FIG. 1. The DFL read head 300 may correspond to, or be a part of, the read/write head 200 described in FIG. 2, such as the magnetic read head 211.

The DFL read head 300 includes a first shield (S1) 302, a seed layer 304, a first free layer (FL) 306, a barrier layer 308, a second FL 310, a capping layer 312, and a second shield (S2) 322. The seed layer 304 includes a material selected from the group that includes tantalum (Ta), tungsten (W), and combinations thereof. In one embodiment, the barrier layer 308 comprises MgO. The DFL read head 300 further includes a first synthetic antiferromagnetic (SAF) soft bias (SB) (e.g., a side shield) that includes a first lower SB 316a, a first spacer 318a such as ruthenium, and a first upper SB 320a and a second SAF SB that includes a second lower SB 316b, a second spacer 318b such as ruthenium, and a second upper SB 320b. The magnetic moments or magnetization directions for the first FL 306 and the second FL 310 may be antiparallel due to the antiparallel biasing from the SAF SB.

As shown in FIG. 3B, the DFL read head 300 further includes a rear hard bias (RHB) 346 and an insulation 352. The insulation 352 may be aluminum oxide (AlOx) or any other suitable insulation material. The RHB 346 generates a magnetic field pointing away from the insulation 352 and towards the following layers: the first FL 306, the barrier layer 308, the second FL 310, and the capping layer 312. The RHB 346 may include cobalt platinum (CoPt), and the RHB 346 is magnetically decoupled from shield 322 by inserting a nonmagnetic layer 360 between RHB 346 and shield 322. The RHB 346 has a magnetization direction (e.g., in the z-direction) perpendicular to a magnetization direction (e.g., in the x-direction) of the first FL 306 and the second FL 310. Before the magnetic recording head comprising the DFL read head 300 is shipped from the production line, the RHB 346 typically needs to be magnetically initialized by a magnetic field in the z-direction. The magnetic field in the z-direction may destabilize the shields of a write head, such as the write head 210 of FIG. 2, or the write head 400 of FIG. 4, as addressed and discussed further below.

FIG. 4 illustrates a MFS view of a write head 400 of a magnetic recording head, according to one embodiment. The write head 400 may correspond to, or be a part of, the magnetic head assembly 121 described in FIG. 1. The write head 400 may correspond to, or be a part of, the read/write head 200 described in FIG. 2, such as the write head 210. Moreover, the write head 400 of FIG. 4 and the DFL read head 300 of FIGS. 3A-3B may be within the same magnetic recording drive, magnetic recording device, magnetic recording head, and/or read/write head. Thus, as referred to herein, the DFL read head 300 of FIGS. 3A-3B and the write head 400 of FIG. 4 may be referred to as being within the same magnetic recording drive or magnetic recording device, e.g., as shown in FIG. 2 with the write head 400 correspond to, or be a part of, the write head 210, and the DFL read head 300 corresponding to, or be a part of, the read head 211, and as additionally shown in the aspects of the magnetic recording device 900 of FIG. 9.

The write head 400 comprises a main pole 430, side shields 428 disposed adjacent to the main pole 430 (e.g., the x-direction), a leading shield 437 disposed below the main pole 430 and side shields 428 (e.g., the −y-direction), a trailing shield 434 disposed above the main pole 430 and side shields 428 (e.g., the y-direction), and an upper return pole 432 disposed above the trailing shield 434. A pair of side gaps (not shown) may be disposed in between the main pole 430 and the side shields 428. The leading shield 437 comprises a lower leading shield 438 and an upper leading shield 436. The upper leading shield 436 may be the upper leading shield 237a of FIG. 2, and the lower leading shield 438 may be the lower leading shield 237b of FIG. 2. In some embodiments, the leading shield 437 further comprises the side shields 428. The side shields 428 may be very thin as compared to the lower leading shield 438 and/or upper leading shield 436, and may be magnetically coupled to the upper leading shield 436.

In other embodiments, the leading shield 437 comprises only one magnetic layer, rather than the upper leading shield 436 and the lower leading shield 438. As used herein, a single magnetic leading shield refers to a leading shield having only one magnetic or magnetization direction, which may still comprise one or more layers. In such embodiments, the single magnetic leading shield has a thickness in the y-direction (e.g., about 1 µm or less) that is less than that of a leading shield with multiple shield portions, which has a combined thickness (e.g., about 1.2 µm or greater) of the upper leading shield 436 (e.g., about 0.6 µm or greater) and the lower leading shield 438 (e.g., about 0.6 µm or greater). As such, the single magnetic leading shield would have the second magnetization direction 442, which would be less stable than a multi-portion leading shield comprising the upper leading shield 436 and the lower leading shield 438 having different magnetic or magnetization directions 442 and 440 as shown in FIG. 4.

The lower leading shield 438, the upper leading shield 436, and the trailing shield 434 each has a magnetization direction. For example, for write head performance reliability reasons, it may be preferred that the lower leading shield 438 has a first magnetization direction 440 pointing in a first direction, such as the −x-direction, the upper leading shield 436 has a second magnetization direction 442 pointing in a second direction opposite the first direction, and the trailing shield 434 has a third magnetization direction 444 pointing in the second direction. While the first, second, and third magnetization directions may be different or vary, the lower leading shield 438 having a first magnetization direction 440 pointing in the first direction and the upper leading shield 436 and the trailing shield 434 having the second and third magnetization directions 442, 444, respectively, pointing in the second direction stabilize the write head 400. That the first magnetization direction 440 is pointing in the −x-direction is for the magnetization to serve as a flux-closure magnetization to the second magnetization direction 442. In some designs, the first magnetization direction is formed naturally from the strong closure flux from the second magnetization direction 442. Such magnetization directions of the various shields (i.e., the lower leading shield 438, the upper leading shield 436, and the trailing shield 434) result in the write head 400 being stable, as well as improve the track interference (XTI) performance (cross-track interference (CTI), adjacent track interference (ATI), far-track interference (FTI), near track interference (NTI) are collectively referred to as XTI).

As discussed above in FIG. 3B, the RHB 346 of the DFL read head 300 has a magnetization direction perpendicular to a magnetization direction of the first FL 306 and the second FL 310. To achieve these magnetization directions, the DFL read head 300 undergoes a magnetization initialization, which includes applying magnetic fields in various directions to achieve the desired magnetization directions of the RHB 346 and the first and second FLs 306, 310. The magnetization initialization requirements of the DFL read head 300 may affect or impact the magnetization directions 440, 442, 444 of the lower leading shield 438, the upper leading shield 436, and/or the trailing shield 434 of the magnetic recording head 300, which may cause stability issues to the write head 400. However, the effects of the magnetization initialization of the DFL read head 300 may be mitigated to achieve the desired shield magnetization directions of the write head 400.

FIGS. 5A-8B illustrate how to mitigate the destabilizing effects on the shields of the write head 400 from the magnetic fields applied during the magnetization initialization of the magnetic recording head due to the DFL read head 300. FIGS. 5A-8B illustrate an asymmetric shield 500, 600, 700, 800, respectively, of the write head 400 of FIG. 4, where each asymmetric shield 500, 600, 700, 800 may individually be the lower leading shield 438, the upper leading shield 436, and/or the trailing shield 434.

FIG. 5A illustrates a first asymmetric shield 500 before the magnetization initialization, and FIG. 5B illustrates the first asymmetric shield 500 after the magnetization initialization, according to one embodiment.

The first shield 500 comprises a first leg 552 coupled to a second leg 554. The first leg 552 is disposed at or along the MFS 550 (illustrated by the dashed line) (e.g., has a length extending in the x-direction). The second leg 554 extends from the MFS 550 (e.g., has a length extending in the z-direction), and is disposed at an acute angle or substantially perpendicular to the first leg 552 (e.g., disposed at about 40° to about 90° with respect to the MFS 550 in the positive x-direction). In other words, the first shield 500 has an L-like shape. As used herein, the asymmetry of the first shield 500 refers to the first shield having a first leg 552 disposed at the MFS 550 and a second leg 554 coupled to one end of the first leg 552, making the first shield 500 asymmetric. In some embodiments, the first leg 552 has a length in the x-direction that is the same as a length of the second leg 554 in the z-direction. In other embodiments, the first leg 552 has a length in the x-direction that is different than a length of the second leg 554 in the z-direction.

The first leg 552 has a first end 552a and a second end 552b, and the second leg 554 has a first end 554a and a second end 554b. The second end 552b of the first leg 552 is coupled to the second end 554b of the second leg 554. A flux-closure domain wall 556 is created or disposed at or near the point of contact between the second ends 552b, 554b of the first and second legs 552, 554. As shown in FIG. 5A, before the magnetization initialization, the first leg 552 has a first magnetization direction 558a pointing from the second end 552b to the first end 552a (i.e., in the −x-direction). The second leg 554 has a second magnetization direction 560a pointing from the first end 554a to the second end 554b (i.e., in the −z-direction). In other words, a south pole (S) of the first leg 552 is disposed adjacent to a north pole (N) of the second leg 554 at the flux-closure domain wall 556.

During the magnetization initialization of the DFL read head 300, one or more of a perpendicular magnetic initialization 562 and/or a parallel magnetic initialization 564, or likely both perpendicular and parallel magnetic initializations, one after the other, is applied to the magnetic recording device as a whole due to the DFL read head 300 being within the overall device, and thus, is also applied to the first shield 500. As shown in FIG. 5B, upon either the perpendicular magnetic initialization 562 or the parallel magnetic initialization 564, the first leg 552 has a third magnetization direction 558b (i.e., in the x-direction) opposite or anti-parallel to the first magnetization direction 558a, and the second leg 554 has a fourth magnetization direction 560b (i.e., in the z-direction) opposite or anti-parallel to the second magnetization direction 560a. In other words, the third magnetization direction 558b of the first leg 552 points from the first end 552a to the second end 552b such that the north and south poles of the first leg 552 are opposite to that shown in FIG. 5A (i.e., pre-magnetization initialization). The fourth magnetization direction 560b of the second leg 554 points from the second end 554b to the first end 554a such that the north and south poles of the second leg 554 are also opposite to that shown in FIG. 5A (i.e., pre-magnetization initialization).

In one embodiment, the upper leading shield 436 and/or the trailing shield 434 is fabricated as the shield 500 in FIG. 5B. Because the third magnetization direction 558b of the first leg 552 in FIG. 5B points in the x-direction, the third magnetization direction 558b of the first leg 552 in FIG. 5B corresponds to one or more of the second and third magnetization directions 442, 444 of the upper leading shield 436 and/or the trailing shield 434 shown in FIG. 4. The same effect applies in other embodiments with a single leading shield when it is fabricated as the shield 500 in FIG. 5B (when a single leading shield if the leading shield 437 does not comprise the upper leading shield 436 and the lower leading shield 438, as discussed above). As such, by attaching the second leg 554 to the second end 552b of the first leg 552 (e.g., the right-hand side or the x-direction), a more stable magnetization direction pointing in the x-direction or to the right is achieved.

It is to be noted that the pre-initialization magnetization state described in FIG. 5A (e.g., the less favorable magnetization directions 558a and 560a) may appear approximately 50% of the time, simply due to statistics of an uninitialized population. For the other 50%, the pre-initialized magnetization states (e.g., the more favorable magnetization directions 558b and 560b) may be like shown in FIG. 5B. In such cases, the magnetization directions 558b and 560b of the shields will remain in their favorable magnetization state, perhaps more so due to getting reinforced by the magnetic initialization.

By including the second leg 554 coupled to the first leg 552, the second leg 554 can utilize the perpendicular (or parallel) magnetization initialization to cause the first leg 552 to have a desired magnetization direction. The first leg 552 and the second leg 554 each having north and south poles causes either the first leg 552 or the second leg 554 to switch magnetization directions, which then results in the other leg (e.g., the first leg 552) switching as well, as the north pole of one leg (e.g., the first leg 552) will be drawn or attracted to the south pole of the other leg (e.g., the second leg 554) at the flux-closure domain wall 556. This may further be due to the north poles of each leg 552, 554 repelling one another, and/or the south poles of each leg 552, 554 repelling one another, as a north pole of one leg (e.g., the first leg 552) being disposed adjacent to the south pole of the other leg (e.g., the second leg 554) is the more favorable, natural, and stable magnetization state.

FIG. 6A illustrates a second asymmetric shield 600 before the magnetization initialization, and FIG. 6B illustrates the second asymmetric shield 600 after the magnetization initialization, according to another embodiment.

The second shield 600 comprises a first leg 652 coupled to a second leg 654. The first leg 652 is disposed at or along the MFS 550 (illustrated by the dashed line) (e.g., has a length extending in the x-direction). The second leg 654 extends from the MFS 550 (e.g., has a length extending in the z-direction), and is disposed at an obtuse angle substantially perpendicular to the first leg 652 (e.g., disposed at about 90° angle to about a 140° angle with respect to the MFS 550 in the positive x-direction). In other words, the second shield 600 has an L-like shape. As used herein, the asymmetry of second shield 600 refers to the first shield having a first leg 652 disposed at the MFS 550 and a second leg 654 coupled to one end of the first leg 652, making the second shield 600 asymmetric. In some embodiments, the first leg 652 has a length in the x-direction that is the same as a length of the second leg 654 in the z-direction. In other embodiments, the first leg 652 has a length in the x-direction that is different than a length of the second leg 654 in the z-direction.

The first leg 652 has a first end 652a and a second end 652b, and the second leg 654 has a first end 654a and a second end 654b. The first end 652a of the first leg 652 is coupled to the second end 654b of the second leg 654. Thus, the second shield 600 is similar to the first shield 500 of FIGS. 5A-5B; however, the second leg 654 is coupled to the opposite end of the first leg 652 (i.e., the left-hand side of the first leg 652 or the −x-direction). A flux-closure domain wall 656 is created or disposed at or near the point of contact between the first end 652a of the first leg 652 and the second end 654b of the second leg 654. As shown in FIG. 6A, before the magnetization initialization, the first leg 652 has a first magnetization direction 658a pointing from the first end 652a to the second end 652b (i.e., in the x-direction), which is opposite to that shown in the first shield 500 of FIGS. 5A-5B. The second leg 654 has a second magnetization direction 660a pointing from the first end 654a to the second end 654b (i.e., in the −z-direction). In other words, a south pole (S) of the first leg 652 is disposed adjacent to a north pole (N) of the second leg 654 at the flux-closure domain wall 656.

During the magnetization initialization of the DFL read head 300, one or more of a perpendicular magnetic initialization 562 and/or a parallel magnetic initialization 564, or likely both perpendicular and parallel magnetic initializations, one after the other, is applied to the magnetic recording device as a whole due to the DFL read head 300 being within the overall device, and thus, is also applied to the second shield 600. As shown in FIG. 6B, upon the perpendicular magnetic initialization 562, the first leg 652 has a third magnetization direction 658b (i.e., in the −x-direction) opposite or anti-parallel to the first magnetization direction 658a, and the second leg 654 has a fourth magnetization direction 660b (i.e., in the z-direction) opposite or anti-parallel to the second magnetization direction 660a. The fourth magnetization direction 660b entices the first leg 652 to have the third magnetization direction 658b. In other words, the third magnetization direction 658b of the first leg 652 points from the second end 652b to the first end 652a such that the north and south poles of the first leg 652 are opposite to that shown in FIG. 6A (i.e., pre-magnetization initialization). The fourth magnetization direction 660b of the second leg 654 points from the second end 654b to the first end 654a such that the north and south poles of the second leg 654 are also opposite to that shown in FIG. 6A (i.e., pre-magnetization initialization).

In one embodiment, the lower leading shield 438 is fabricated as the shield 600 in FIG. 6B. Because the third magnetization direction 658b of the first leg 652 in FIG. 6B points in the −x-direction, the third magnetization direction 658b of the first leg 652 in FIG. 6B corresponds to the first magnetization direction 440 of the lower leading shield 438 shown in FIG. 4, and serves as a stabilization flux-closure path for the stronger second magnetization direction 442 in the upper leading shield 436 to reduce the tendency for the second magnetization direction 442 to destabilize the third magnetization direction 444. As such, by attaching the second leg 654 to the first end 652a of the first leg 652 (e.g., the left-hand side or the −x-direction), a more stable magnetization direction pointing in the −x-direction or to the left is achieved. As mentioned above, since the lower leading shield 438 serves as a stabilization flux-closure path for the upper leading shield 436, the first magnetization direction 440 of the lower leading shield 438 in the −x-direction is maintained mainly by the stronger second magnetization direction 442 in the x-direction, and is further helped by the magnetization direction 660b of the second leg 654.

It is to be noted that the pre-initialization magnetization state described in FIG. 6A (e.g., the less favorable magnetization directions 658a and 660a) may appear approximately 50% of the time, simply due to statistics of an uninitialized population. For the other 50%, the pre-initialized magnetization states (e.g., the more favorable magnetization directions 658b and 660b) may be like shown in FIG. 6B. In such cases, the magnetization directions 658b and 660b of the shields will remain in their favorable magnetization state, perhaps more so due to getting reinforced by the magnetic initialization.

By including the second leg 654 coupled to the first leg 652, the second leg 654 can utilize the perpendicular magnetization initialization, which is often required by a DFL read head, to cause the first leg 652 to have a desired magnetization direction. The first leg 652 and the second leg 654 each having north and south poles causes either the first leg 652 or the second leg 654 to switch magnetization directions, which then results in the other leg (e.g., the first leg 652) switching as well, as the north pole of one leg (e.g., the first leg 652) will be drawn or attracted to the south pole of the other leg (e.g., the second leg 654) at the flux-closure domain wall 656. This may further be due to the north poles of each leg 652, 654 repelling one another, and/or the south poles of each leg 652, 654 repelling one another, as a north pole of one leg (e.g., the first leg 652) being disposed adjacent to the south pole of the other leg (e.g., the second leg 654) is the more favorable, natural, and stable magnetization state.

FIG. 7A illustrates a third asymmetric shield 700 before the magnetization initialization, and FIG. 7B illustrates the third asymmetric shield 700 after the magnetization initialization, according to one embodiment.

The third shield 700 comprises a first leg 752 coupled to a second leg 754. The first leg 752 is disposed at or along the MFS 550 (illustrated by the dashed line) (e.g., has a length extending in the x-direction). The second leg 754 extends from the MFS 550 (e.g., has a length extending in the z-direction), and is disposed at an acute angle of about 30° to about 85° with respect to the MFS 550 in the positive x-direction. In other words, the third shield 700 has a hockey stick-like shape. As used herein, the asymmetry of the third shield 700 refers to the first shield having a first leg 752 disposed at the MFS 550 and a second leg 754 coupled to one end of the first leg 752, making the third shield 700 asymmetric. In some embodiments, the first leg 752 has a length in the x-direction that is the same as a length of the second leg 754 in the xz-direction. In other embodiments, the first leg 752 has a length in the x-direction that is different than a length of the second leg 754 in the xz-direction.

The first leg 752 has a first end 752a and a second end 752b, and the second leg 754 has a first end 754a and a second end 754b. The second end 752b of the first leg 752 is coupled to the second end 754b of the second leg 754. A flux-closure domain wall 756 is created or disposed at or near the point of contact between the second ends 752b, 754b of the first and second legs 752, 754. As shown in FIG. 7A, before the magnetization initialization, the first leg 752 has a first magnetization direction 758a pointing from the second end 752b to the first end 752a (i.e., in the −x-direction). The second leg 754 has a second magnetization direction 760a pointing from the first end 754a to the second end 754b (i.e., in the −z-direction). In other words, a south pole (S) of the first leg 752 is disposed adjacent to a north pole (N) of the second leg 754 at the flux-closure domain wall 756.

During the magnetization initialization of the DFL read head 300, one or more of a perpendicular magnetic initialization 562 and/or a parallel magnetic initialization 564, or likely both perpendicular and parallel magnetic initializations, one after the other, is applied to the magnetic recording device as a whole due to the DFL read head 300 being within the overall device, and thus, is also applied to the third shield 700. As shown in FIG. 7B, upon either the perpendicular magnetic initialization 562 or the parallel magnetic initialization 564, the first leg 752 has a third magnetization direction 758b (i.e., in the x-direction) opposite or anti-parallel to the first magnetization direction 758a, and the second leg 754 has a fourth magnetization direction 760b (i.e., in the z-direction) opposite or anti-parallel to the second magnetization direction 760a. In other words, the third magnetization direction 758b of the first leg 752 points from the first end 752a to the second end 752b such that the north and south poles of the first leg 752 are opposite to that shown in FIG. 7A (i.e., pre-magnetization initialization). The fourth magnetization direction 760b of the second leg 754 points from the second end 754b to the first end 754a such that the north and south poles of the second leg 754 are also opposite to that shown in FIG. 7A (i.e., pre-magnetization initialization).

In one embodiment, the upper leading shield 436 and/or the trailing shield 434 is fabricated as the shield 700 in FIG. 7B. Because the third magnetization direction 758b of the first leg 752 in FIG. 7B points in the x-direction, the third magnetization direction 758b of the first leg 752 in FIG. 7B corresponds to one or more of the second and third magnetization directions 442, 444 of the upper leading shield 436 and/or the trailing shield 434 shown in FIG. 4. The same effect applies in other embodiments with a single leading shield when it is fabricated as the shield 700 in FIG. 7B (when a single leading shield if the leading shield 437 does not comprise the upper leading shield 436 and the lower leading shield 438, as discussed above). As such, by attaching the second leg 754 to the second end 752b of the first leg 752 (e.g., the right-hand side or the x-direction), a more stable magnetization direction pointing in the x-direction or to the right is achieved.

It is to be noted that the pre-initialization magnetization state described in FIG. 7A (e.g., the less favorable magnetization directions 758a and 760a) may appear approximately 50% of the time, simply due to statistics of an uninitialized population. For the other 50%, the pre-initialized magnetization states (e.g., the more favorable magnetization directions 758b and 760b) may be like shown in FIG. 7B. In such cases, the magnetization directions 758b and 760b of the shields will remain in their favorable magnetization state, perhaps more so due to getting reinforced by the magnetic initialization.

By including the second leg 754 coupled to the first leg 752, the second leg 754 can utilize the perpendicular (or parallel) magnetization initialization to cause the first leg 752 to have a desired magnetization direction. The first leg 752 and the second leg 754 each having north and south poles causes either the first leg 752 or the second leg 754 to switch magnetization directions, which then results in the other leg (e.g., the first leg 752) switching as well, as the north pole of one leg (e.g., the first leg 752) will be drawn or attracted to the south pole of the other leg (e.g., the second leg 754) at the flux-closure domain wall 756. This may further be due to the north poles of each leg 752, 754 repelling one another, and/or the south poles of each leg 752, 754 repelling one another, as a north pole of one leg (e.g., the first leg 752) being disposed adjacent to the south pole of the other leg (e.g., the second leg 754) is the more favorable, natural, and stable magnetization state.

FIG. 8A illustrates a fourth asymmetric shield 800 before the magnetization initialization, and FIG. 8B illustrates the fourth asymmetric shield 800 after the magnetization initialization, according to another embodiment.

The fourth shield 800 comprises a first leg 852 coupled to a second leg 854. The first leg 852 is disposed at or along the MFS 550 (illustrated by the dashed line) (e.g., has a length extending in the x-direction). The second leg 854 extends from the MFS 550 (e.g., has a length extending in the z-direction), and is disposed at an obtuse angle of about 95° to about 150° with respect to the MFS 550 in the positive x-direction. In other words, the fourth shield 800 has a hockey stick-like shape. As used herein, the asymmetry of fourth shield 800 refers to the first shield having a first leg 852 disposed at the MFS 550 and a second leg 854 coupled to one end of the first leg 852, making the fourth shield 800 asymmetric. In some embodiments, the first leg 852 has a length in the x-direction that is the same as a length of the second leg 854 in the xz-direction. In other embodiments, the first leg 852 has a length in the x-direction that is different than a length of the second leg 854 in the xz-direction.

The first leg 852 has a first end 852a and a second end 852b, and the second leg 854 has a first end 854a and a second end 854b. The first end 852a of the first leg 852 is coupled to the second end 854b of the second leg 854. Thus, the fourth shield 800 is similar to the third shield 700 of FIGS. 7A-7B; however, the second leg 854 is coupled to the opposite end of the first leg 852 (i.e., the left-hand side of the first leg 852 or the −x-direction). A flux-closure domain wall 856 is created or disposed at or near the point of contact between the first end 852a of the first leg 852 and the second end 854b of the second leg 854. As shown in FIG. 8A, before the magnetization initialization, the first leg 852 has a first magnetization direction 858a pointing from the first end 852a to the second end 852b (i.e., in the x-direction). The second leg 854 has a second magnetization direction 860a pointing from the first end 854a to the second end 854b (i.e., in the −z-direction). In other words, a south pole (S) of the first leg 852 is disposed adjacent to a north pole (N) of the second leg 854 at the flux-closure domain wall 856.

During the magnetization initialization of the DFL read head 300, one or more of a perpendicular magnetic initialization 562 and/or a parallel magnetic initialization 564, or likely both perpendicular and parallel magnetic initializations, one after the other, is applied to the magnetic recording device as a whole due to the DFL read head 300 being within the overall device, and thus, is also applied to the fourth shield 800. As shown in FIG. 8B, upon the perpendicular magnetic initialization 562, the first leg 852 has a third magnetization direction 858b (i.e., in the −x-direction) opposite or anti-parallel to the first magnetization direction 858a, and the second leg 854 has a fourth magnetization direction 860b (i.e., in the z-direction) opposite or anti-parallel to the second magnetization direction 860a. The fourth magnetization direction 860b entices the first leg 852 to have the third magnetization direction 858b. In other words, the third magnetization direction 858b of the first leg 852 points from the second end 852b to the first end 852a such that the north and south poles of the first leg 852 are opposite to that shown in FIG. 8A (i.e., pre-magnetization initialization). The fourth magnetization direction 860b of the second leg 854 points from the second end 854b to the first end 854a such that the north and south poles of the second leg 854 are also opposite to that shown in FIG. 8A (i.e., pre-magnetization initialization).

In one embodiment, the lower leading shield 438 is fabricated as the shield 800 in FIG. 8B. Because the third magnetization direction 858b of the first leg 852 in FIG. 8B points in the −x-direction, the third magnetization direction 858b of the first leg 852 in FIG. 8B is the first magnetization direction 440 of the lower leading shield 438 shown in FIG. 4, and serves as a stabilization flux-closure path for the stronger second magnetization direction 442 in the upper leading shield 436 to reduce the tendency for the second magnetization direction 442 to destabilize the third magnetization direction 444. As such, by attaching the second leg 854 to the first end 852a of the first leg 852 (e.g., the left-hand side or the −x-direction), a more stable magnetization direction pointing in the −x-direction or to the left is achieved. As mentioned above, since the lower leading shield 438 serves as a stabilization flux-closure path for the upper leading shield 436, the first magnetization direction 440 of the lower leading shield 438 in the −x-direction is maintained mainly by the stronger second magnetization direction 442 in the x-direction, and is further helped by the magnetization direction 860b of the second leg 854.

It is to be noted that the pre-initialization magnetization state described in FIG. 8A (e.g., the less favorable magnetization directions 858a and 860a) may appear approximately 50% of the time, simply due to statistics of an uninitialized population. For the other 50%, the pre-initialized magnetization states (e.g., the more favorable magnetization directions 858b and 860b) may be like shown in FIG. 8B. In such cases, the magnetization directions 858b and 860b of the shields will remain in their favorable magnetization state, perhaps more so due to getting reinforced by the magnetic initialization.

By including the second leg 854 coupled to the first leg 852, the second leg 854 can utilize the perpendicular magnetization initialization, which is often required by a DFL read head, to cause the first leg 852 to have a desired magnetization direction. The first leg 852 and the second leg 854 each having north and south poles causes either the first leg 852 or the second leg 854 to switch magnetization directions, which then results in the other leg (e.g., the first leg 852) switching as well, as the north pole of one leg (e.g., the first leg 852) will be drawn or attracted to the south pole of the other leg (e.g., the second leg 854) at the flux-closure domain wall 856. This may further be due to the north poles of each leg 852, 854 repelling one another, and/or the south poles of each leg 852, 854 repelling one another, as a north pole of one leg (e.g., the first leg 852) being disposed adjacent to the south pole of the other leg (e.g., the second leg 854) is the more favorable, natural, and stable magnetization state.

Figure 9:
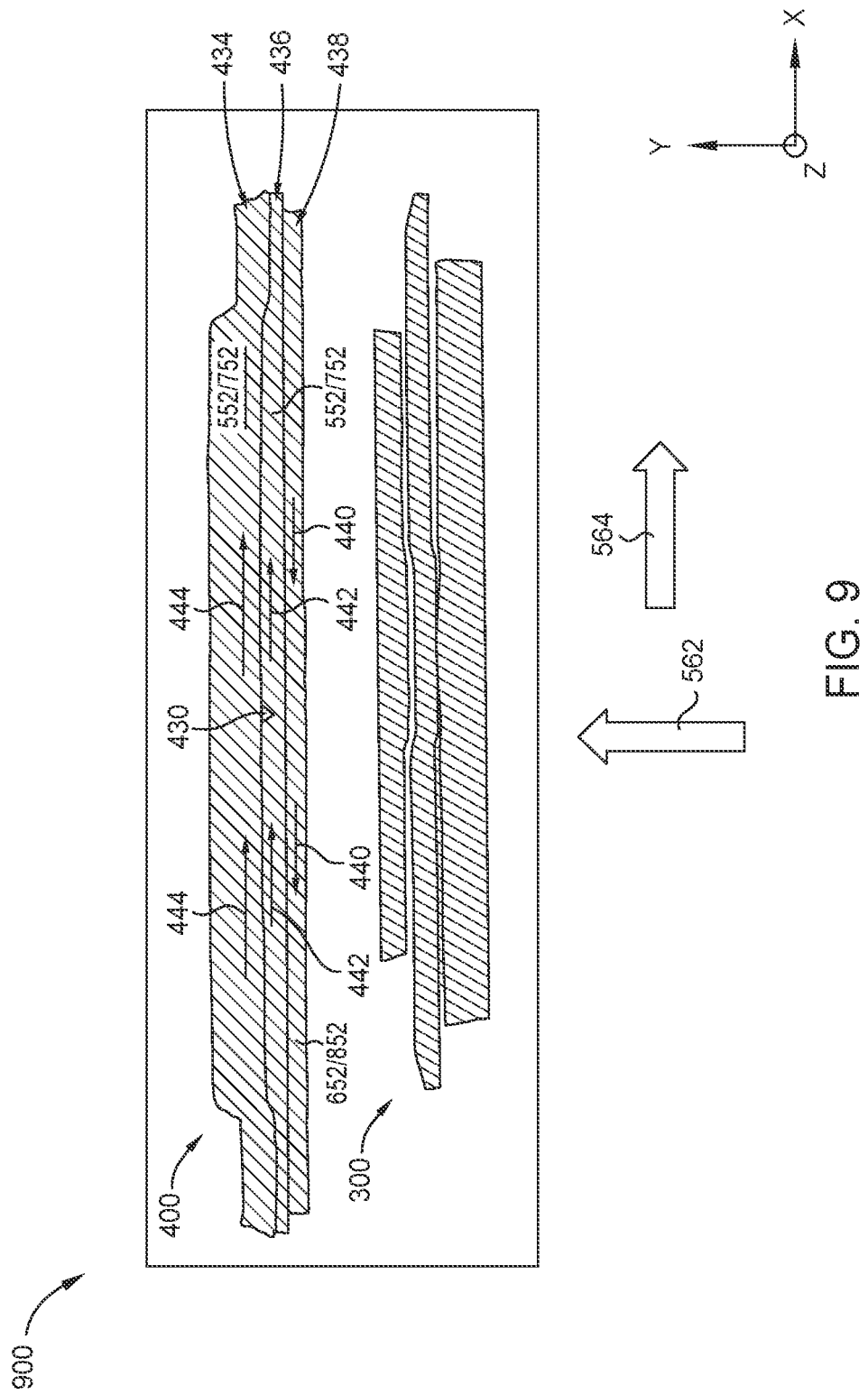
FIG. 9 illustrates a magnetic recording device comprising the DFL read head of FIGS. 3A-3B and the write head of FIG. 4 after a magnetization initialization, according to one embodiment.

FIG. 9 illustrates a MFS view of aspects of a magnetic recording device 900 comprising the DFL read head 300 of FIGS. 3A-3B and the write head 400 of FIG. 4 after a magnetization initialization, according to one embodiment. The magnetic recording device 900 may correspond to, or be a part of, the magnetic head assembly 121 described in FIG. 1. The magnetic recording device 900 may correspond to, or be a part of, the read/write head 200 described in FIG. 2. As shown, the DFL read head 300 is disposed adjacent to the write head 400. The MFS view of FIG. 9 is provided only as an illustration of the magnetization directions of the various shields, as well as the placement of the write head 400 with respect to the DFL read head 300 within a magnetic recording device. As such, the MFS view of FIG. 9 is not intended to be limiting, and is included as an example only.

In the magnetic recording device 900, the lower leading shield 438 may be either the second shield 600 of FIG. 6B or the fourth shield 800 of FIG. 8B, the upper leading shield 436 may be either the first shield 500 of FIG. 5B or the third shield 700 of FIG. 7B, and the trailing shield 434 may be either the first shield 500 of FIG. 5B or the third shield 700 of FIG. 7B. Thus, the lower leading shield 438 comprises a second leg (not shown) extending in the z-direction coupled to the left hand side of the first leg 652 or 852 (i.e., in the x-direction direction of the first leg 652 or 852), and the upper leading shield 436 and the trailing shield 434 each individually comprise a second leg (not shown) extending in the z-direction coupled to the right hand side of the first leg 552 or 752 (i.e., in the x-direction direction of the first leg 552 or 752).

After applying a perpendicular magnetization initialization 562 into the magnetic recording head 900 (i.e., in the z-direction) and/or a parallel magnetization initialization 564 (i.e., in the x-direction) to the DFL read head 300, the lower leading shield 438 has the first magnetization direction 440 extending from right to left, or in the −x-direction, the upper leading shield 436 has the second magnetization direction 442 extending from left to right, or in the x-direction anti-parallel to the first magnetization direction 440, and the trailing shield 434 has the third magnetization direction 444 extending from left to right, or in the x-direction anti-parallel to the first magnetization direction 440. The first magnetization direction 440 serves as a flux-closure path for the stronger second magnetization direction 442 so that the second magnetization direction 442 will be less destabilizing for the third magnetization direction 444.

Figure 10:
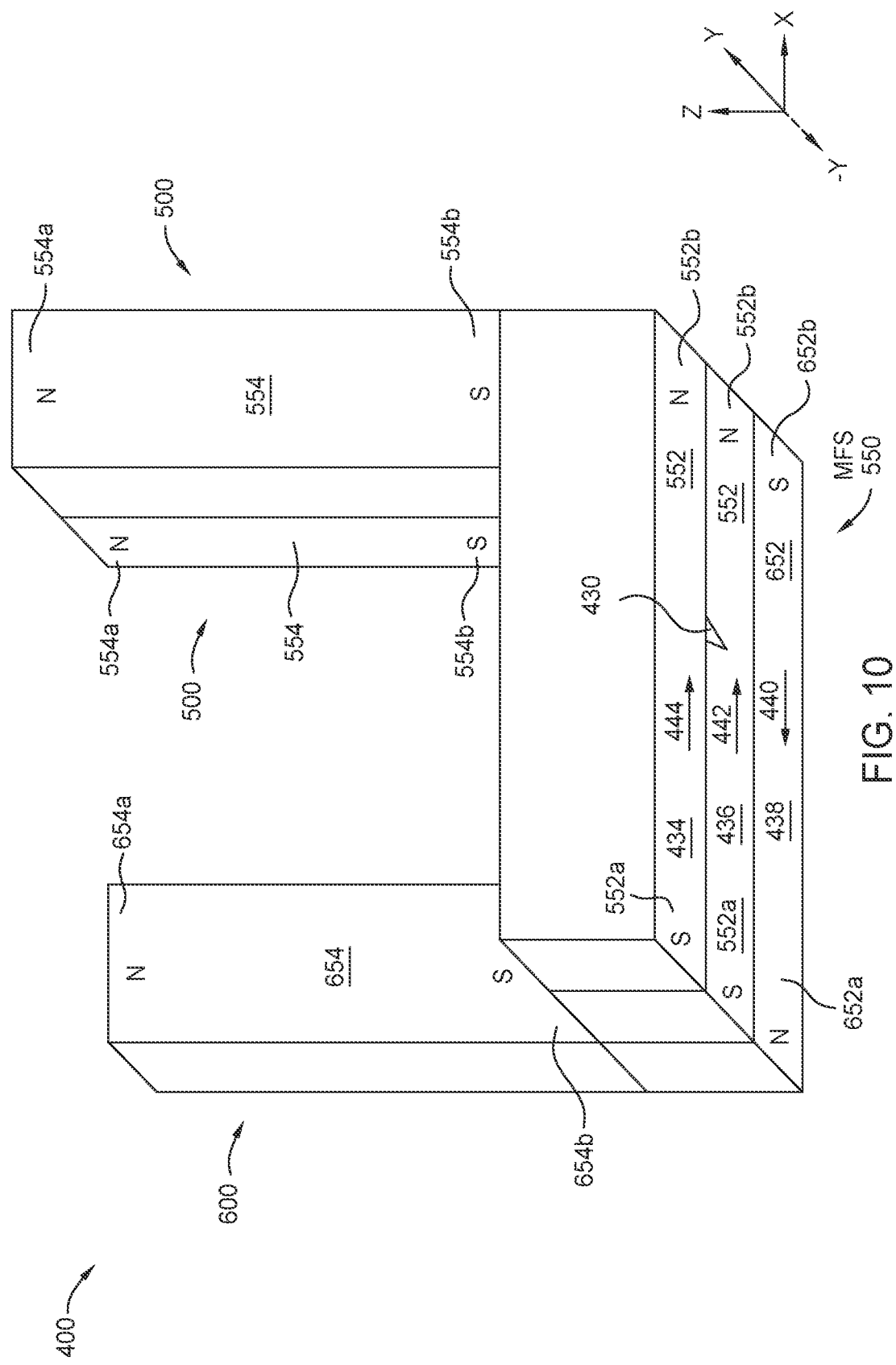
FIG. 10 illustrates a perspective view of a portion of the magnetic recording head or write head of FIG. 4 after magnetization initialization has been applied, according to one embodiment.

FIG. 10 illustrates a perspective view of a portion of the shields of the write head 400 of FIG. 4 after magnetization initialization has been applied, according to one embodiment. The perspective view of the write head 400 of FIG. 10 shows only the trailing shield 434, the upper leading shield 436, the lower leading shield 438, and a tip of the main pole 430, each of which have a surface disposed at the MFS 550. The upper leading shield 436 is disposed on the lower leading shield 438 in the y-direction, and the trailing shield 434 is disposed on the upper leading shield 436 in the y-direction.

The perspective view of the write head 400 of FIG. 10 is not drawn to scale. Furthermore, while FIG. 10 illustrates each of the trailing shield 434, the upper leading shield 436, the lower leading shield 438 being asymmetric and comprising a second leg 554, 654, in some embodiments, only one or more of the trailing shield 434, the upper leading shield 436, the lower leading shield 438 may comprise a second leg 554, 654 while one or more of the trailing shield 434, the upper leading shield 436, the lower leading shield 438 comprising only a first leg 552, 652.

In the perspective view of the write head 400, the trailing shield 434 is the first shield 500 of FIG. 5B, the upper leading shield 436 is the first shield 500 of FIG. 5B, and the lower leading shield 438 is the second shield 600 of FIG. 6B. However, the trailing shield 434 may be the third shield 700 of FIG. 7B, the upper leading shield 436 may be the third shield 700 of FIG. 7B, and the lower leading shield 438 may be the fourth shield 800 of FIG. 8B. Thus, the first leg 552 of the trailing shield 434 is disposed at the MFS 550, the first leg 552 of the upper leading shield 436 is disposed at the MFS 550, and the first leg 652 of the lower leading shield 438 is disposed at the MFS 550. Furthermore, the second end 552b of the first leg 552 of the trailing shield 434 is coupled to the second end 554b of the second leg 554 of the trailing shield 434, the second end 552b of the first leg 552 of the upper leading shield 436 is coupled to the second end 554b of the second leg 554 of the upper leading shield 436, and the first end 652a of the first leg 652 of the lower leading shield 438 is coupled to the second end 654b of the second leg 654 of the lower leading shield 438.

As further shown, the north pole of the upper leading shield 436 is aligned with the north pole of the trailing shield 434 (i.e., the north poles of the upper leading shield 436 and the trailing shield 434 are at the second end 552b of the first leg 552). However, the south pole of the lower leading shield 438 is aligned with the north poles of the upper leading shield 436 and the trailing shield 434 (i.e., the north pole of the lower leading shield 438 is at the first end 652a of the first leg 652). Thus, after magnetization initialization has been applied to the DFL read head 300, the magnetization direction 440 of the lower leading shield 438 at the MFS 550 extends in the −x-direction or from right to left, the magnetization direction 442 of the upper leading shield 436 at the MFS 550 extends in the x-direction or from left to right, and the magnetization direction 444 of the trailing shield 434 at the MFS 550 extends in the x-direction or from left to right. In other words, the magnetization direction 440 of the lower leading shield 438 is opposite to the magnetization directions 442, 444 of the upper leading shield 436 and the trailing shield 434, respectively, and the north pole of the lower leading shield 438 is opposite the north poles of the upper leading shield 436 and the trailing shield 434.

It is to be noted that FIG. 10 is an exemplary embodiment, and aspects of the various shields may not be shown to scale or to exact alignment. For example, the width of the trailing shield 434 in the x-direction and the width of the upper leading shield 436 in the x-direction may not be the same at the MFS. As such, the respective second legs 554 of each of the trailing shield 434 and the upper leading shield 436 may not be aligned in the x-direction. In other words, the second leg 554 of the trailing shield 434 may not be disposed precisely on top and aligned with the second leg 554 of the upper leading shield 436.

Therefore, by including a second leg coupled to a first leg disposed at the MFS, the second leg can utilize perpendicular (or in the case of the shield 700 of FIGS. 7A-7B, also parallel) magnetization initialization applied to a DFL read head to cause the first leg to have a desired magnetization direction. In addition, the parallel magnetization initialization 564 applied to a DFL read head will help the first leg to have a desired magnetization direction in shields 500 and 700 of FIGS. 5A-5B and 7A-7B, respectively, in a direct manner. The first leg and the second leg each having north and south poles causes either the first leg or the second leg to switch magnetization directions, which then results in the other leg switching as well, as the north pole of one leg will be drawn or attracted to the south pole of the other leg at the flux-closure domain wall. This may further be due to the north poles of each leg repelling one another, and/or the south poles of each leg repelling one another, as a north pole of one leg being disposed adjacent to the south pole of the other leg is the more favorable, natural, and stable magnetization state. As such, perpendicular (or parallel) magnetization initialization applied to a DFL read head will not cause the shields of the write head to have unfavorable magnetization direction.

In one embodiment, a magnetic recording head comprises a dual free layer read head, and a magnetic recording write head disposed adjacent to the dual free layer read head, the magnetic recording write head comprising: a main pole disposed at a media facing surface (MFS), a lower leading shield disposed below the main pole at the MFS, an upper leading shield disposed between the lower leading shield and the main pole at the MFS, and a trailing shield disposed above the main pole at the MFS, wherein one or more of the lower leading shield, the upper leading shield, and the trailing shield comprises a first leg disposed at and parallel to the MFS and a second leg coupled to the first leg, the second leg extending from the MFS in a direction perpendicular to the MFS, wherein the first leg and the second leg each individually comprise a first end and a second end having opposite magnetic poles.

The second leg is disposed at an angle of about 30° to about 150° with respect to the MFS. The lower leading shield comprises the first leg and the second leg, wherein the first end of the first leg of the lower leading shield is coupled to the first end of the second leg of the lower leading shield, and wherein the first end of the first leg has an opposite magnetic pole than the first end of the second leg. The upper leading shield comprises the first leg and the second leg, wherein the second end of the first leg of the upper leading shield is coupled to the first end of the second leg of the upper leading shield, the second end of the first leg of the upper leading shield being opposite the first end of the first leg of the lower leading shield, and wherein the second end of the first leg of the upper leading shield has an opposite magnetic pole than the first end of the second leg of the upper leading shield. The trailing shield comprises the first leg and the second leg, wherein the second end of the first leg of the trailing shield is coupled to the first end of the second leg of the trailing shield, the second end of the first leg of the trailing shield being opposite the first end of the first leg of the lower leading shield, and wherein the second end of the first leg of the trailing shield has an opposite magnetic pole than the first end of the second leg of the trailing shield. The upper leading shield and the trailing shield each individually has a second magnetization direction at the MFS anti-parallel to the first magnetization direction. A magnetic recording device comprises the magnetic recording head and a dual free layer read head.

In another embodiment, a magnetic recording head comprises a write head, the write head comprising a main pole disposed at a MFS, a lower leading shield disposed below the main pole, the lower leading shield comprising a first leg disposed at the MFS and a second leg extending from the MFS in a direction perpendicular to the MFS, a first end of the second leg being coupled to a first end of the first leg, wherein the first end of the first leg and the first end of the second leg have opposite magnetic poles, and an upper leading shield disposed between the lower leading shield and the main pole, the upper leading shield comprising a third leg disposed at the MFS and a fourth leg extending from the MFS in the direction perpendicular to the MFS, wherein a first end of the third leg is aligned with the first end of the first leg of the lower leading shield, and wherein a second end of the third leg opposite the first end is coupled to a first end of the fourth leg, the second end of the third leg and the first end of the fourth leg have opposite magnetic poles.

The magnetic recording head further comprises a trailing shield disposed above the main pole, the trailing shield comprising a fifth leg disposed at the MFS and a sixth leg extending from the MFS in the direction perpendicular to the MFS, wherein a first end of the fifth leg is aligned with the first end of the first leg of the lower leading shield, and wherein a second end of the fifth leg opposite the first end is coupled to a first end of the sixth leg, the second end of the fifth leg and the first end of the sixth leg having opposite magnetic poles. The second leg of the lower leading shield is disposed at an angle of about 90° to about 140° with respect to the MFS, the fourth leg of the upper leading shield is disposed at an angle of about 40° to about 90° with respect to the MFS, and the sixth leg of the trailing shield is disposed at an angle of about 40° to about 90° with respect to the MFS. The second leg of the lower leading shield is disposed at an angle of about 30° to about 85° with respect to the MFS, the fourth leg of the upper leading shield is disposed at an angle of about 30° to about 85° with respect to the MFS, and the sixth leg of the trailing shield is disposed at an angle of about 30° to about 85° with respect to the MFS. The lower leading shield has a first magnetization direction at the MFS, and wherein the trailing shield has a second magnetization direction at the MFS anti-parallel to the first magnetization direction. The lower leading shield has a first magnetization direction at the MFS, and wherein the upper leading shield has a second magnetization direction at the MFS anti-parallel to the first magnetization direction. A magnetic recording device comprises the magnetic recording head and a dual free layer read head.

In yet another embodiment, a magnetic recording device comprises a dual free layer read head and a magnetic recording write head disposed adjacent to the dual free layer read head. The magnetic recording write head comprises an asymmetric lower leading shield disposed at a media facing surface (MFS), the asymmetric lower leading shield comprising a first leg disposed at the MFS and a second leg extending from the MFS in a direction perpendicular to the MFS, the second leg being coupled to a first end of the first leg, an asymmetric upper leading shield disposed on the asymmetric lower leading shield, the asymmetric upper leading shield comprising a third leg disposed at the MFS and a fourth leg extending from the MFS in the direction perpendicular to the MFS, wherein a first end of the third leg is aligned with the first end of the first leg of the asymmetric lower leading shield, and wherein a second end of the third leg opposite the first end is coupled to a fourth leg, and an asymmetric trailing shield disposed over the asymmetric upper leading shield, the asymmetric trailing shield comprising a fifth leg disposed at the MFS and a sixth leg extending from the MFS in the direction perpendicular to the MFS, wherein a first end of the fifth leg is aligned with the first end of the first leg of the asymmetric lower leading shield, and wherein a second end of the fifth leg opposite the first end is coupled to a sixth leg.

The asymmetric lower leading shield has a first initial magnetization direction, and wherein the asymmetric upper leading shield and the asymmetric trailing shield each individually have a second initial magnetization direction anti-parallel to the first initial magnetization direction. A magnetization initialization is applied to the dual free layer read head to switch the first initial magnetization direction of the asymmetric lower leading shield to a first final magnetization direction, the first final magnetization direction being anti-parallel to the first initial magnetization direction. A magnetization initialization is applied to the dual free layer read head to switch the second initial magnetization direction of the asymmetric upper leading shield and the asymmetric trailing shield to a second final magnetization direction, the second final magnetization direction being anti-parallel to the second initial magnetization direction. The second leg of the asymmetric lower leading shield is disposed at an angle of about 30° to about 150° with respect to the MFS, the fourth leg of the asymmetric upper leading shield is disposed at an angle of about 30° to about 150° with respect to the MFS, and the sixth leg of the asymmetric trailing shield is disposed at an angle of about 30° to about 150° with respect to the MFS. The fourth leg of the asymmetric upper leading shield is disposed on the sixth leg of the asymmetric trailing shield. The second leg of the asymmetric lower leading shield is un-aligned with the fourth leg of the asymmetric upper leading shield and the sixth leg of the asymmetric trailing shield.

While the foregoing is directed to embodiments of the present disclosure, other and further embodiments of the disclosure may be devised without departing from the basic scope thereof, and the scope thereof is determined by the claims that follow.

What is claimed is:

1. A magnetic recording head, comprising:
 a dual free layer read head; and
 a magnetic recording write head disposed adjacent to the dual free layer read head, the magnetic recording write head comprising:
  a main pole disposed at a media facing surface (MFS);
  a lower leading shield disposed below the main pole at the MFS;
  an upper leading shield disposed between the lower leading shield and the main pole at the MFS; and
  a trailing shield disposed above the main pole at the MFS, wherein:
   one or more of the lower leading shield, the upper leading shield, and the trailing shield comprises a first leg disposed at and parallel to the MFS and a second leg coupled to the first leg, the second leg extending from the MFS in a direction perpendicular to the MFS,
   the first leg and the second leg each individually comprise a first end and a second end having opposite magnetic poles, and
   the lower leading shield comprises the first leg and the second leg, wherein the first end of the first leg of the lower leading shield is coupled to the first end of the second leg of the lower leading shield, and wherein the first end of the first leg has an opposite magnetic pole than the first end of the second leg.

2. The magnetic recording head of claim 1, wherein the second leg is disposed at an angle of about 30° to about 150° with respect to the MFS.

3. The magnetic recording head of claim 1, wherein the upper leading shield comprises a third leg and a fourth leg, wherein a first end of the third leg of the upper leading shield extends from the MFS in a direction perpendicular to the MFS and is coupled to a second end of the fourth leg of the upper leading shield disposed at and parallel to the MFS, the first end of the third leg of the upper leading shield being opposite the first end of the first leg of the lower leading shield, and wherein the first end of the third leg of the upper leading shield has an opposite magnetic pole than the second end of the fourth leg of the upper leading shield.

4. The magnetic recording head of claim 1, wherein the trailing shield comprises a fifth leg and sixth leg, wherein a first end of the fifth leg of the trailing shield extends from the MFS in a direction perpendicular to the MFS and is coupled to a second end of the sixth leg of the trailing shield disposed at and parallel to the MFS, the first end of the fifth leg of the trailing shield being opposite the first end of the first leg of the lower leading shield, and wherein the first end of the fifth leg of the trailing shield has an opposite magnetic pole than the first end of the sixth leg of the trailing shield.

5. The magnetic recording head of claim 1, wherein the lower leading shield has a first magnetization direction at the MFS, and wherein the upper leading shield and the trailing shield each individually has a second magnetization direction at the MFS anti-parallel to the first magnetization direction.

6. A magnetic recording device, comprising the magnetic recording head of claim 1.

7. A magnetic recording head comprising a write head, the write head comprising:
 a main pole disposed at a media facing surface (MFS);
 a lower leading shield disposed below the main pole, the lower leading shield comprising a first leg disposed at the MFS and a second leg extending from the MFS in a direction perpendicular to the MFS, a first end of the second leg being coupled to a first end of the first leg, wherein the first end of the first leg and the first end of the second leg have opposite magnetic poles; and
 an upper leading shield disposed between the lower leading shield and the main pole, the upper leading shield comprising a third leg disposed at the MFS and a fourth leg extending from the MFS in the direction perpendicular to the MFS, wherein a first end of the third leg is aligned with the first end of the first leg of the lower leading shield, and wherein a second end of the third leg opposite the first end is coupled to a first end of the fourth leg, the second end of the third leg and the first end of the fourth leg have opposite magnetic poles.

8. The magnetic recording head of claim 7, further comprising: a trailing shield disposed above the main pole, the trailing shield comprising a fifth leg disposed at the MFS and a sixth leg extending from the MFS in the direction perpendicular to the MFS, wherein a first end of the fifth leg is aligned with the first end of the first leg of the lower leading shield, and wherein a second end of the fifth leg opposite the first end is coupled to a first end of the sixth leg, the second end of the fifth leg and the first end of the sixth leg having opposite magnetic poles.

9. The magnetic recording head of claim 8, wherein the second leg of the lower leading shield is disposed at an angle of about 40° to about 90° with respect to the MFS, the fourth leg of the upper leading shield is disposed at an angle of about 90° to about 140° with respect to the MFS, and the sixth leg of the trailing shield is disposed at an angle of about 40° to about 90° with respect to the MFS.

10. The magnetic recording head of claim 8, wherein the second leg of the lower leading shield is disposed at an angle of about 30° to about 85° with respect to the MFS, the fourth leg of the upper leading shield is disposed at an angle of about 30° to about 85° with respect to the MFS, and the sixth leg of the trailing shield is disposed at an angle of about 30° to about 85° with respect to the MFS.

11. The magnetic recording head of claim 8, wherein the lower leading shield has a first magnetization direction at the MFS, and wherein the trailing shield has a second magnetization direction at the MFS anti-parallel to the first magnetization direction.

12. The magnetic recording head of claim 7, wherein the lower leading shield has a first magnetization direction at the MFS, and wherein the upper leading shield has a second magnetization direction at the MFS anti-parallel to the first magnetization direction.

13. A magnetic recording device, comprising:
the magnetic recording head of claim 7; and
a dual free layer read head.

14. A magnetic recording device, comprising:
a dual free layer read head; and
a magnetic recording write head disposed adjacent to the dual free layer read head, the magnetic recording write head comprising:
an asymmetric lower leading shield disposed at a media facing surface (MFS), the asymmetric lower leading shield comprising a first leg disposed at the MFS and a second leg extending from the MFS in a direction perpendicular to the MFS, the second leg being coupled to a first end of the first leg;
an asymmetric upper leading shield disposed on the asymmetric lower leading shield, the asymmetric upper leading shield comprising a third leg disposed at the MFS and a fourth leg extending from the MFS in the direction perpendicular to the MFS, wherein a first end of the third leg is aligned with the first end of the first leg of the asymmetric lower leading shield, and wherein a second end of the third leg opposite the first end is coupled to the fourth leg; and
an asymmetric trailing shield disposed over the asymmetric upper leading shield, the asymmetric trailing shield comprising a fifth leg disposed at the MFS and a sixth leg extending from the MFS in the direction perpendicular to the MFS, wherein a first end of the fifth leg is aligned with the first end of the first leg of the asymmetric lower leading shield, and wherein a second end of the fifth leg opposite the first end is coupled to the sixth leg.

15. The magnetic recording device of claim 14, wherein the asymmetric lower leading shield has a first initial magnetization direction, and wherein the asymmetric upper leading shield and the asymmetric trailing shield each individually have a second initial magnetization direction anti-parallel to the first initial magnetization direction.

16. The magnetic recording device of claim 15, wherein a magnetization initialization is applied to the dual free layer read head to switch the first initial magnetization direction of the asymmetric lower leading shield to a first final magnetization direction, the first final magnetization direction being anti-parallel to the first initial magnetization direction.

17. The magnetic recording device of claim 15, wherein a magnetization initialization is applied to the dual free layer read head to switch the second initial magnetization direction of the asymmetric upper leading shield and the asymmetric trailing shield to a second final magnetization direction, the second final magnetization direction being anti-parallel to the second initial magnetization direction.

18. The magnetic recording device of claim 14, wherein the second leg of the asymmetric lower leading shield is disposed at an angle of about 30° to about 150° with respect to the MFS, the fourth leg of the asymmetric upper leading shield is disposed at an angle of about 30° to about 150° with respect to the MFS, and the sixth leg of the asymmetric trailing shield is disposed at an angle of about 30° to about 150° with respect to the MFS.

19. The magnetic recording device of claim 14, wherein the fourth leg of the asymmetric upper leading shield is disposed on the sixth leg of the asymmetric trailing shield, and wherein the second leg of the asymmetric lower leading shield is un-aligned with the fourth leg of the asymmetric upper leading shield and the sixth leg of the asymmetric trailing shield.

\* \* \* \* \*